United States Patent
Reusens

(10) Patent No.: US 6,704,397 B1
(45) Date of Patent: Mar. 9, 2004

(54) FILTER ARRANGEMENT

(75) Inventor: Peter Paul Frans Reusens, Laarne (BE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/327,532

(22) Filed: Jun. 8, 1999

(30) Foreign Application Priority Data

Jun. 26, 1998 (EP) .............................................. 98401588

(51) Int. Cl.$^7$ ............................................... H04M 11/00
(52) U.S. Cl. ................................ 379/93.09; 379/93.07; 379/93.08
(58) Field of Search ........................... 379/93.09, 93.07, 379/93.08, 93.31, 93.01, 93.05, 399.01, 413.02; 375/222

(56) References Cited

U.S. PATENT DOCUMENTS 6,144,734 A * 11/2000 Beeman
6,144,735 A * 11/2000 Bella

* cited by examiner

*Primary Examiner*—Duc Nguyen
(74) *Attorney, Agent, or Firm*—Sughrue Mion, PLLC

(57) ABSTRACT

A filter arrangement particularly adapted to be used in a "splitter" of an ADSL system where several POTS equipment, e.g., subscriber sets, are connected to a same telecommunication line. The arrangement, located at the customer premises, includes for each POTS equipment a distinct low-pass filter circuit to separate low frequency POTS signals from high frequency ADSL signals simultaneously transmitted over the same copper twisted-pair telecommunication line. Each low-pass filter circuit is provided with a current sensing circuit, e.g., an electrical relay, which activates a switch when the current flowing through the filter exceeds a predetermined value. Since several high order filter circuits can not be put in parallel, mainly because their capacitive values will then add, the present filter circuit is basically a 1$^{st}$ order filter that comprises the series connection of two transformers separated by the coil of the relay. When the current increases, i.e., because the associated subscriber set goes off-hook, the switch activated by the relay inserts a capacitor across the line and between the two transformers. The filter circuit becomes then a 3$^{rd}$ order filter based on the cascade connection of the first transformer, the capacitor and the second transformer. Since the order to the other filters circuits of the arrangement is not changed, there is no mutual disturbance.

15 Claims, 2 Drawing Sheets

FILTER ARRANGEMENT

BACKGROUND OF THE INVENTION

The present invention relates to a filter arrangement comprising a plurality of filter means each including at least one reactive filtering element operating according to a predetermined filtering order and having a first filter port and a second filter port, the second filter ports of all the filter means being interconnected to a common port of said arrangement.

Such a line filter arrangement is known in the art and may for instance be used to isolate several apparatuses from a device connected to the common input port. An important application of such a filter arrangement may be found in the Asymmetric Digital Subscriber Line (ADSL) systems, as well as in systems derived therefrom, such as HDSL, VDSL, etc. As well known, these systems provide broadband services over a classical copper twisted pair telecommunication line, whereby a user may use these services without the need to wait for having a fiber connected to its premises.

The ADSL system today combines, over a same telecommunication line, high-speed ADSL signals and low-speed telephone - or voice - signals for a Plain Old Telephone Service (POTS) equipment. At each end of the telecommunication line, i.e. at the customer premises side and at the central office side, these signals are separated by means of a so-called "splitter". A splitter is a duplex filter including a high-pass part and a low-pass part. The high-pass part is often integrated in an ADSL modem and is adapted to remove the low-speed - or low-frequency - components of the signal transmitted on the telecommunication line. On the other hand, the low-pass part is adapted to remove all the high-frequency components from the signal. These components will thus be blocked by a reactive filtering element included in this low-pass part so that they will not be transmitted between the telecommunication line and the POTS equipment.

At the customer premises side, the topology of an ADSL connection requires the low-pass part or filter means to be put at the entry point of the home, or at least in front of all the existing POTS equipment in the home. The existing POTS equipment is then seen in parallel with the ADSL modem. The low-pass part serves as a shield, protecting the ADSL modem from being disturbed by ringing current, off-hook and on-hook DC current changes, and associated AC and DC transients including dial pulses of the POTS.

The ADSL modem is linked to the telephone street-wire, i.e. the telecommunication line, at the same location. The disadvantage of this location is the requirement to add a wire to the existing home-wiring in order to connect the ADSL modem to the telecommunication line. To avoid adding a wire to connect the ADSL modem, it is proposed to install the ADSL modem without the splitter's low-pass part on any existing telephone outlet. Then, the ADSL modem is not protected at all. It sees all disturbances of the POTS signaling. The disturbance of the off-hook/ on-hook transitions is not only caused by voltage and current events, but also by the impedance changes, which suddenly put an unknown impedance in parallel with the ADSL modem 100 Ohm impedance. The rotary dial pulses are the worst in this respect, because the impedance changes constantly for a duration of dialing phase. As a consequence, once the POTS are in steady state after the off-hook transition, the ADSL transceiver connected to the modem must retrain the equalizers and optional echo-cancellers associated thereto.

Additionally, non-linearities of the POTS equipment may cause a modulation of the line signal that is heard as a loud noise in the ear-piece of the telephone, and can disrupt modem, Fax and answering machines.

To reduce the negative effect of all these - and other - disturbances, and in case several POTS equipments are connected to the telecommunication line, an individual low-pass protection filter shielding each POTS equipment from the ADSL signals needs to be provided.

When a single filter is used, such filter can be complex to optimally serve the needs of shielding POTS and ADSL modem. However, in a parallel connection of such individual low-pass protection filters, the filter can only consist of a single reactive element and this is often not sufficient to filter-out the on-hook/ off-hook actions of the POTS equipment on ADSL. Also the off-hooked POTS equipment is still disturbed by the ADSL signal. This is caused by the low-order of the filter means. On the other hand, higher-order filter means can not be put in parallel on more than one individual piece or group of POTS equipment. Indeed, each filter means of higher order would contain a parallel capacitive impedance and all these capacitive values will add. This will create the equivalent of a large bridged tap on the telephone line, which will create a major reduction of the return loss. The user will then experience a severe enhancement of the side tone in its phone. This is unacceptable.

SUMMARY OF THE INVENTION

An object of the invention is to provide a filtering arrangement with improved individual filter means in order to better filter-out on-hook/off-hook actions and other disturbances of the POTS equipment, while reducing or avoiding the mutual disturbance of several filter means put in parallel. The individual filter means are adding then extra protection for the POTS equipment which is off-hook and which, precisely in that state, needs more shielding.

According to the invention, this object is achieved due to the fact that at least one of said filter means further includes sensing means adapted to sense a parameter of the power supplied via said filter means and to control insertion means adapted to insert a second reactive filtering element adapted to modify said predetermined filtering order.

In this way, actions such as off-hook may be detected by the sensing means. As a result, the sensing means insert additional reactive filtering element to the filter means associated to the device whereof the action was detected. This additional reactive filtering element changes the topology of the filter means whereby the filtering order of these filter means is for instance increased. The filter means adds so extra protection for the POTS device which is off-hook and which, precisely in that state and as mentioned above, needs more shielding.

This will only change the single filter means which is in series with the active POTS equipment. The other filter means will remain at the former lower filtering order, shielding the on-hooked equipment. The parallel combination of all the low order filter means and the single filter means that changed to a higher order protection is not causing the effect of a bad mismatch between the POTS impedance and the telephone line. The mutual disturbance of different filter means put in parallel is thus very low.

Afterwards, any impedance change of the active POTS equipment is also masked with the improved filter means.

Similarly the signal of the ADSL, which is passing through the filter means to the active POTS equipment and which is often still audible as a loud background noise will also be masked by the higher filtering order of the filter means.

Another characteristic feature of the present invention is that the first mentioned reactive filtering element is of a first reactive type, whilst said second reactive filtering element is of a second reactive type, different of said first reactive type, and that said insertion means include an electrical switch adapted to couple said first reactive filtering element to said second reactive filtering element.

The predetermined filtering order of the filter means is modified by combining two reactive elements of different type, e.g. an inductance and a capacitance.

Also another characteristic feature of the present filter arrangement is that said first filter port comprises a first and a second terminal, that said second filter port comprises a third and a fourth terminal, that the first mentioned reactive filtering element is coupled between said first filter port and said second filter port, and that said second reactive filtering element is coupled between said first terminal and said second terminal.

The filter arrangement is thus particularly adapted to operate on a two-wire telecommunication line. The first filter port is then for instance attached to the POTS equipment, whilst the second filter port is connected to the telecommunication line via the above common port of all the filters in parallel.

Preferably, said sensing means are current sensing means coupled between said first and said second filter port and are adapted to sense the current flowing through said filter means as said parameter of the power supplied to said filter arrangement.

It has been found that the above mentioned state requiring more shielding could be detected by sensing the current flowing through the filter means.

A preferred embodiment of the present filter arrangement Is characterized in that it is a low-pass filter arrangement, in that said first reactive filtering element includes a first and a second transformer, in that said second reactive filtering element includes a capacitance, in that said sensing means are connected in series with said first and said second transformer between said first and said second filter port, and in that the electrical switch of said insertion means is coupled in series with said second reactive filtering element between said first and said second terminal.

In more detail, said first terminal is coupled to said third terminal via the series connection of a first winding of said first transformer, said sensing means and a first winding of said second transformer, said second terminal is coupled to said fourth terminal via the series connection of a second winding of said first transformer and a second winding of said second transformer, the series coupled electrical switch and said second reactive filtering element are connected between the junction point of said sensing means and the first winding of said second transformer, and the junction point of the second winding of said first transformer and the second winding of said second transformer.

In this way, the filter means have formerly a first filtering order that is modified to a third filtering order when the sensing means activate the insertion means.

Yet another characteristic feature of the present invention is that said sensing means are adapted to detect if the sensed current exceeds a predetermined value and to then control said insertion means to close said electrical switch.

The current exceeds for instance a predetermined value when the subscriber set is off-hooked. By closing the electrical switch, the capacitance is then added to the inductance circuit and the filtering order of the filter means associated to the subscriber set is increased to better shield the subscriber set from the telecommunication line.

Further characteristic features of the present filter arrangement are mentioned in the appended claims.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

DETAILED DESCRIPTION OF THE INVENTION

Figure 1:
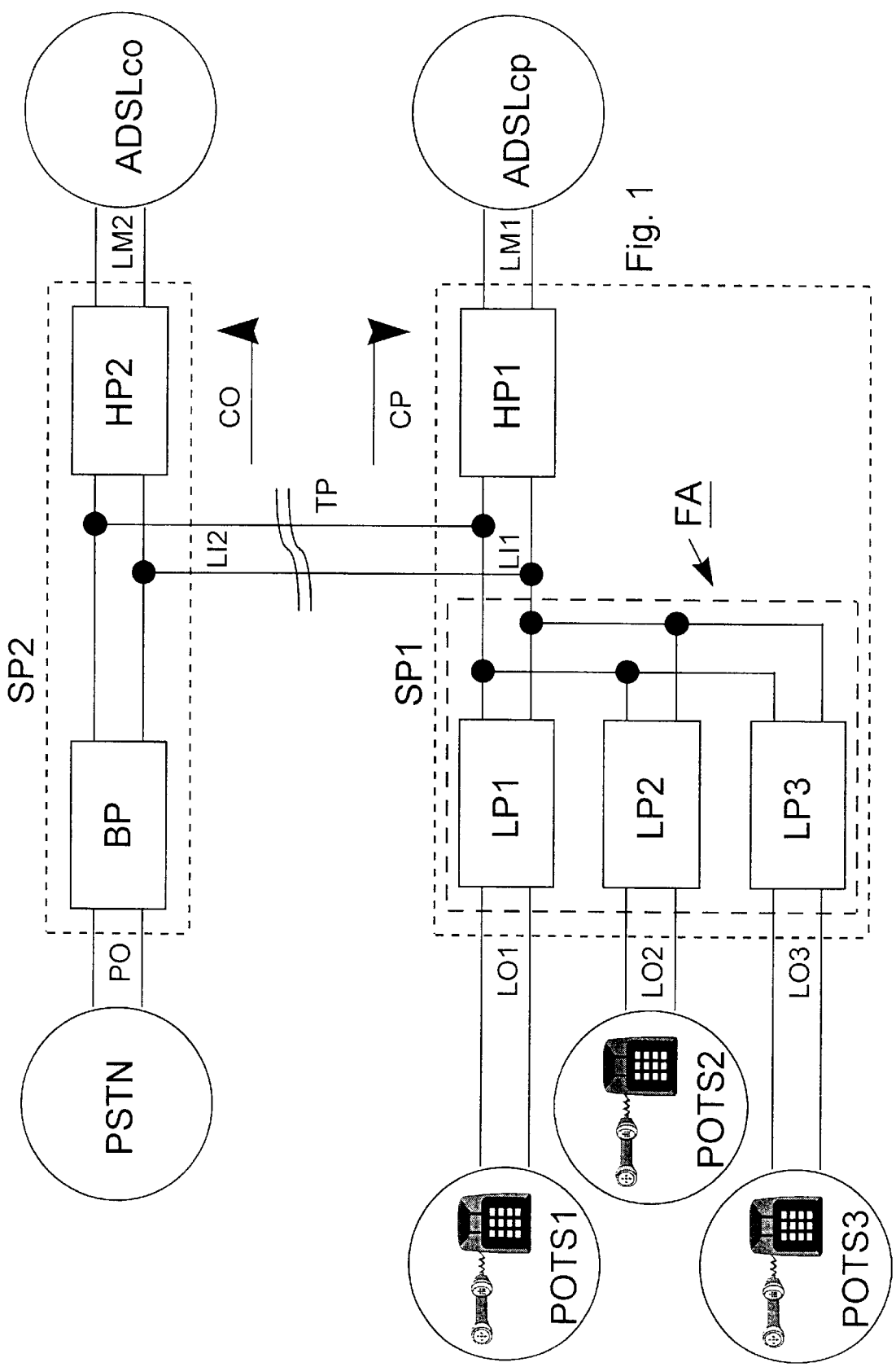
FIG. 1 is an overview of an ADSL telecommunication system including a filter arrangement FA according to the invention.

Although not limited to any particular field of use, the filter arrangement of the present invention is particularly applicable to a distributed splitter for an Asymmetric Digital Subscriber Line "ADSL" system as shown in FIG. 1. As known, an ADSL system —or a similar system such as HDSL, VDSL, . . . —is adapted to transmit voice and higher frequency signals over a classical copper twisted-pair telephone line TP. At each end of the twisted-pair telecommunication line TP is provided a distributed splitter that separates the high frequency ADSL signals from the low frequency Plain Old Telephone Service POTS (or voice) signals.

In more detail, at the customer premises side CP a splitter SP1 has a line port LI1 that connects one end of the telecommunication line TP both to a port LM1 of a local ADSL modem ADSLcp and to different local ports LO1 to LO3 of distinct user subscriber sets POTS1 to POTS3, whilst at the central office side CO another splitter SP2 has a line port L12 that connects the other end of the telecommunication line TP both to a port LM2 of a central ADSL modem ADSLco and to a local port PO of a Public Switching Telecommunication Network PSTN. It is to be noted that the three POTS equipments or subscriber sets POTS1–POTS3 are only given as an example and that in practice most any number of POTS equipment may be connected to the line port LI1.

To ensure the connections, the splitter SP1 includes a high-pass filter circuit HP1 that interconnects the ports LI1 and LM1, and low-pass filter circuits LP1, LP2 and LP3 that interconnect the line port LI1 to the distinct local POTS equipments POTS1, POTS2 and POTS3 respectively. It is to be noted that the filter circuits LP1–LP3 together constitute a filter arrangement FA that has the common line port LI1. The splitter SP2 includes a high-pass filter circuit HP2 that interconnects the ports L12 and LM2, and a low-pass filter circuit LP1, BP that interconnects the ports L12 and PO.

Figure 2:
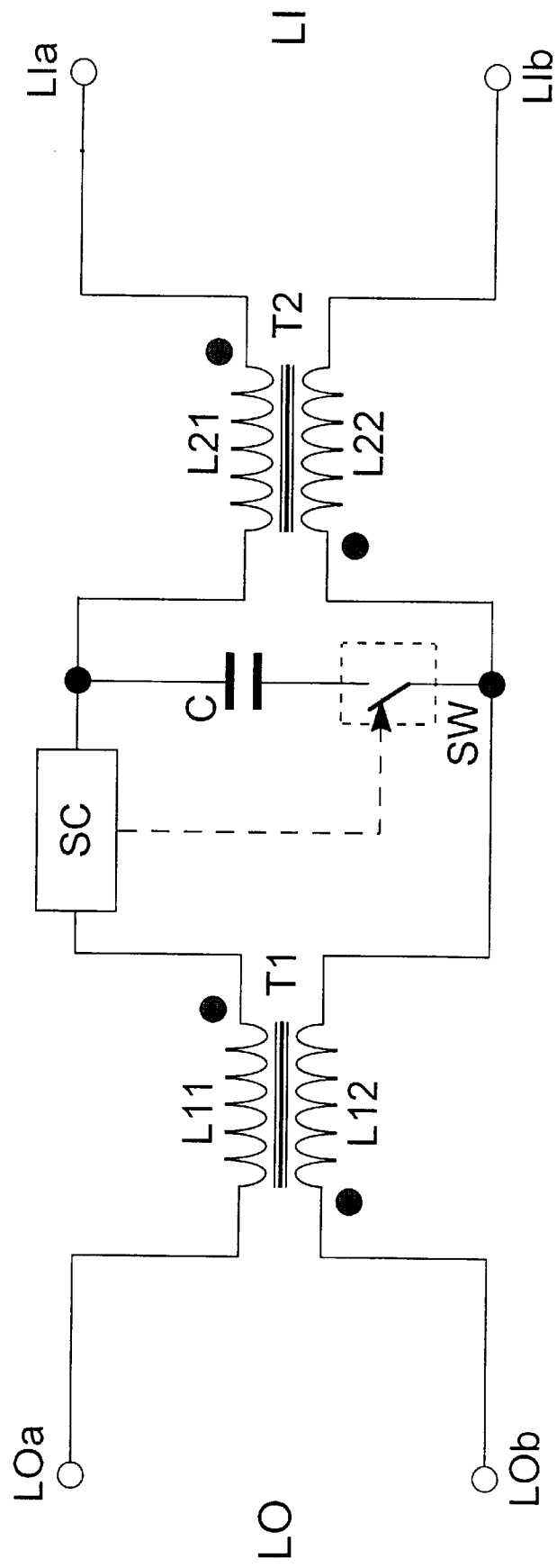
FIG. 2 shows in detail LP one of the filter means LP1–LP3 of the filter arrangement FA of FIG. 1.

The present invention more particularly concerns the filter arrangement FA including the low-pass filter circuits LP1 to LP3. At least one of these filter circuits includes means to modify its filtering order in case a parameter of the signal supplied thereto is changed. More particularly, in the present example, an increase of the current due to a subscriber set is going off-hook will be detected and will lead to an increase of the filtering order of the low-pass filter circuit associated to the off-hooked subscriber set. Preferably, but not obligatory, all the low-pass filter circuits LP1–LP3 of the filter arrangement FA should be provided with such detection or sensing means. Since all the low-pass filter circuits LP1–LP3 are then identical, only one of them, hereafter more generally called LP, will be discussed below. The low-pass filter circuit LP is represented at FIG. 2.

The filter circuit LP is located between a first filter port LO, corresponding to one of the above local ports LO1/LO3, and a second filter port LI, corresponding to the common port LI1 of the filter arrangement FA. The first filter port LO has a first terminal LOa and a second terminal LOb, whilst the second filter port LI has a third terminal L1a and a fourth terminal L1b. The filter circuit LP includes two transformers T1 and T2, a current sensing circuit SC, an electrical switch SW and a capacitor C. In more detail, the first terminal LOa is connected to the third terminal L1a via the series connection of a first winding L11 of the first transformer T1, the current sensing circuit SC and a first winding L21 of the second transformer T2. The second terminal LOb is connected to the fourth terminal L1b via the series connection of a second winding L12 of the first transformer T1 and a second winding L22 of the second transformer T2. As already mentioned, the winding or coils L11–L12 as well as L21–L22 are magnetically coupled into the respective transformers T1 and T2 in order to ensure the symmetry of the filter circuit LP.

The sensing circuit SC is for instance an electrical relay of which the coil is connected between the first windings L11 and L21 of the transformers T1 and T2. The contact or electrical switch SW of the relay SC is connected, in series with the capacitor C, between the junction point of the coil of the relay and the first winding L21, and the junction point of the two second windings L12 and L22.

The filter circuit LP operates as follows.

When a zero or small current flows through LP, the relay SC is not activated. The switch SW is then open and the capacitor is not connected to the circuit. As a result, the filter circuit LP is seen as constituted only by coils or inductances L11, SC, L21; L12, L22. It performs thus a first order filtering between the first and the second filter ports LO and LI.

When the current increases, i.e. when the subscriber set connected to the first filter port LO goes off-hook, the electrical relay SC, that is sensitive to currents above a certain threshold, is activated. The switch SW is then closed and the capacitor C is inserted in the filter circuit LP. As a result, the filter circuit LP has, between the first and the second filter ports LO and LI, the cascade connection of coil L11/L12, capacitance C and again coil L21/L22. LP is then a third order filter. The former single pole filter circuit is then improved and rejects the unwanted ADSL noise in the POTS equipment much better than the first order low-pass filter circuit.

It is to be noted that the relay may further have more contacts (not shown) so that more capacitors could be inserted in the filter circuit LP, e.g. across the first and the second terminals and/or across the third and the fourth terminals. By switching the extra capacitance(s) in parallel with the line, the current detecting relay creates a T or a multiple T type of filter.

The present filter circuit LP may be seen as an individual protection device for the POTS equipment connected thereto. In practice, LP has a short cord ending on a male plug. Its body could be a cylinder with length and diameter about 2.5 cm (1 inch). The body will contain female input for the telephone cord. The filter circuit LP is further is fool-proof as it is fully insensitive to the direction of the insertion. It can be attached at the plug on the POTS equipment or at the wall plug.

It is finally to be noted that, although not shown in the figure, if the sensing circuit SC is constituted by an electrical relay, the latter is preferably bypassed with a capacitance in order to reduce the insertion loss. The bypass capacitance on the relay also avoids the relay to be active when ringing current is flowing through it.

While the principles of the invention have been described above in connection with specific apparatus, it is to be clearly understood that this description is made only by way of example and not as a limitation on the scope of the invention, as defined in the appended claims.

What is claimed is:

1. Filter arrangement comprising a plurality of filter means each filter means comprising at least one first reactive filtering element operating according to a predetermined filtering order and having a first filter port and a second filter port, the second filter ports of all the filter means being interconnected to a common port of said arrangement, wherein at least one of said filter means further comprises sensing means to sense current flowing through said filter means and to control insertion means adapted to insert a second reactive filtering element to modify said predetermined filtering order, and wherein said common port of said filter arrangement is connected to a telecommunication line of an Asymmetric Digital Subscriber Line telecommunication system, and a Plain Old Telephone Service subscriber set is connected to said first filter port.

2. Filter arrangement according to claim 1, wherein said first reactive filtering element is of a first reactive type, and said second reactive filtering element is of a second reactive type that is different of said first reactive type, and said insertion means comprise an electrical switch to couple said first reactive filtering element to said second reactive filtering element.

3. Filter arrangement according to claim 1, wherein said first filter port comprises a first and a second terminal, said second filter port comprises a third and a fourth terminal, said first reactive filtering element is coupled between said first filter port and said second filter port, and said second reactive filtering element is coupled between said first and said second terminal.

4. Filter arrangement according to claim 1, wherein said sensing means are current sensing means coupled between said first filter port and said second filter port.

5. Filter arrangement according to claim 2, wherein said filter arrangement is a low-pass filter arrangement, said first reactive filtering element comprises an inductance, said second reactive filtering element comprises a capacitance, said sensing means are connected in series with said first reactive filtering element between said first filter port and said second filter port, and the electrical switch of said insertion means is coupled in series with said second reactive filtering element between said first terminal and said second terminal.

6. Filter arrangement according to claim 3, wherein said filter arrangement is a low-pass filter arrangement, said first reactive filtering element comprises a first and a second transformer, said second reactive filtering element comprises a capacitance, said sensing means are connected in series with said first transformer and said second transformer between said first filter port and said second filter port, and the electrical switch of said insertion means is coupled in series with said second reactive filtering element between said first terminal and said second terminal.

7. Filter arrangement according to claim 6, wherein said first terminal is coupled to said third terminal via the series connection of a first winding of said first transformer, said sensing means and a first winding of said second transformer, said second terminal is coupled to said fourth terminal the series connection of a second winding of said first transformer and a second winding of said second transformer, and the series coupled electrical switch and said second reactive filtering element am connected between the junction point of said sensing means and the first winding of said second transformer, and the junction point of the second winding of said first transformer and the second winding of said second transformer.

8. Filter arrangement according to claim 2, wherein said sensing means detects if the sensed current exceeds a predetermined value and to then control said insertion means to close said electrical switch.

9. Filter arrangement comprising a plurality of filters, each filter comprising:
   at least one first reactive filtering element operating according to a predetermined filtering order and having a first filter port and a second filter port, the second filter ports of all the filters being interconnected to a common port of said arrangement, wherein at least one of said filters further comprises a sensing circuit to sense current flowing through said filter and to control an insertion circuit to insert a second reactive filtering element to modify said predetermined filtering order, and wherein said common port of said filter arrangement is connected to a telecommunication line of an Asymmetric Digital Subscriber Line telecommunication system, and a Plain Old Telephone Service subscriber set is connected to said first filter port.

10. Filter arrangement according to claim 9, wherein said sensing circuit is a current sensing circuit coupled between said first filter port and said second filter port.

11. A filter comprising:
   a first filter port:
   a second filter port;
   at least one first reactive filtering element operating according to a predetermined filtering order, and
   sensing means to sense current flowing through said filter and to control insertion means that inserts a second reactive filtering element to modify said predetermined filtering order, wherein a Plain Old Telephone Service subscriber set is connected to said first filter port.

12. Filter according to claim 11, wherein said first reactive filtering element comprises a first and a second transformer, said second reactive filtering element comprises a capacitance, said sensing means are connected in series with said first transformer and said second transformer between said first filter port and said second filter port, and the electrical switch of said insertion means is coupled in series with said second reactive filtering element between a first terminal and a second terminal of said first filter port.

13. A filter comprising:
   a first filter port:
   a second filter port;
   at least one first reactive filtering element operating according to a predetermined filtering order; and
   a sensing circuit that senses current flowing through said filter and to control an insertion circuit that switches a second reactive filtering element to modify said predetermined filtering order, wherein a Plain Old Telephone Service subscriber set is connected to said first filter port.

14. Filter according to claim 13, wherein said first reactive filtering element comprises an inductance, said second reactive filtering element comprises a capacitance, said sensing circuit are connected in series with said first reactive filtering element between said first filter port and said second filter port, and the electrical switch of said insertion circuit is coupled in series with said second reactive filtering element between a first terminal and a second terminal of said first filter port.

15. Filter according to claim 13, wherein said first reactive filtering element comprises first and a second transformer, said second reactive filtering element comprises a capacitance, said sensing circuit is connected in series with said first transformer and said second transformer between said first filter port and said second filter port, and the electrical switch of said insertion circuit is coupled in series with said second reactive filtering element between a first terminal and a second terminal of said first filter port.

* * * * *